(12) United States Patent
Mai

(10) Patent No.: US 7,070,298 B2
(45) Date of Patent: Jul. 4, 2006

(54) LIGHT SOURCE MODULE

(75) Inventor: Che-Kuei Mai, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 65 days.

(21) Appl. No.: 10/856,630

(22) Filed: May 27, 2004

(65) Prior Publication Data

US 2005/0111219 A1    May 26, 2005

(30) Foreign Application Priority Data

Nov. 21, 2003    (TW) .............................. 92132669 A

(51) Int. Cl.
*F21V 7/20* (2006.01)
*F21V 7/04* (2006.01)

(52) U.S. Cl. ................ 362/218; 362/611; 362/614; 362/630; 362/632; 362/633; 362/634; 313/11; 313/113

(58) Field of Classification Search .................. 362/218
See application file for complete search history.

(56) References Cited

U.S. PATENT DOCUMENTS 3,673,402 A * 6/1972 Weiss ...................... 362/220
5,343,370 A * 8/1994 Ohashi et al. ............. 362/459
5,731,796 A * 3/1998 Furuhashi et al. ........... 345/96
5,890,794 A * 4/1999 Abtahi et al. .............. 362/294
6,727,649 B1 * 4/2004 Yano et al. ................ 313/607
6,833,657 B1 * 12/2004 Voto et al. .................... 313/11
6,899,444 B1 * 5/2005 Biber et al. ................ 362/345
2002/0113534 A1 * 8/2002 Hayashi et al. ............. 313/113

FOREIGN PATENT DOCUMENTS

| JP | 515711 | * 12/1992 |
| JP | 2002-117812 | 4/2002 |
| TW | 0475069 | 2/2002 |
| TW | 0482928 | 4/2002 |
| WO | WO01/35445 | 5/2001 |

* cited by examiner

*Primary Examiner*—Renee Luebke
*Assistant Examiner*—William J Carter
(74) *Attorney, Agent, or Firm*—Liu & Liu

(57) ABSTRACT

A light source module comprises a lamp cover, a lamp and at least a conductive wire. The lamp is fitted into the lamp cover. The conductive wire connects the lamp cover and the lamp to a ground. The conductive wire is wound around the lamp and the conductive wire has two ends connected to the lamp cover. The lamp cover includes at least a heat conductive plate connected with the conductive wire. The lamp cover, and the lamp are electrically connected to the ground through the conductive wire, so the capacitance therebetween can be eliminated to improve the illumination performance of the light source module.

20 Claims, 9 Drawing Sheets

LIGHT SOURCE MODULE

CROSS-REFERENCE TO RELATED APPLICATION

This application claims the priority benefit of Taiwan application serial no. 92132669, filed on Nov. 21, 2003.

BACKGROUND OF THE INVENTION

1. Field of the Invention

The present invention relates to a light source module, and more particularly, to a light source module employing a conductive wire electrically connecting a lamp to a lamp cover.

2. Description of Related Art

Modem display devices have an decreasingly volume and light weight. A traditional CRT display has a mature image processing technology, wherein discharging cathode ray tube is used for displaying images and therefore the CRT display occupies a large space. Other disadvantages of the CRT display are heavy weight, high radiation and high power consumption. Therefore, with the emergence of flat panel display, such as LCD display, OLED display or PDP display, and its advantages of lightness, smaller space occupation, low power consumption, low radiation and high display quality, the traditional CRT display is gradually being replaced by the flat panel display. Therefore, the flat panel display has become the mainstream of display products.

The LCD display can be generally divided into three types, namely, a reflective LCD display, a transmissive LCD display and a semi-transmissive and semi-reflective LCD display. The reflective LCD display and the semi-reflective LCD display are mainly constructed from a liquid crystal panel and a back light module. The liquid crystal panel is constructed from two transparent panels and a liquid crystal layer sandwiched between the transparent panels. The back light module composed of a lamp cover, a lamp and a light conductive plate is used to illuminate LCD display panel.

In a traditional back light module, the lamp cover is made of metal which can reflect light for improving the illumination efficiency thereof. However, the capacitance generated between the lamp and the lamp cover made of metal has undesirable impacts on the stability of light intensity of the lamp. Therefore, the light emitted from the traditional back light module has an unstable quality. Moreover, if the product has an unfavorable grounding design, the lamp will flash during a knocking test.

SUMMARY OF THE INVENTION

Accordingly, one object of the present invention is to provide a light source module, in which an equal potential exists between a lamp and a lamp cover for preventing the lamp from flashing due to capacitance built-up. The present invention overcomes the problem in the prior art by electrically coupling the lamp cover and the surface of the lamp to prevent capacitance built-up between the lamp cover and the lamp. Further, the lamp cover and the lamp surface may be electrically grounded.

The simplest embodiment of the present invention would be to simply electrically coupling or shorting the surface of the lamp to the lamp cover using a wire, for example. Alternatively or in addition, the surface of the lamp and the lamp cover may be separately grounded to a ground terminal, or the electrically coupled lamp surface and lamp cover may be grounded. To facilitate electrically coupling to the lamp surface, either from the lamp cover or the ground terminal, a conductive layer may be provided on the lamp or sections thereof, in the form of a continuous layer (preferably a transparent or light transmitting layer), a conductive perforated layer, a conductive net or mesh, a conductive sleeve, or a conductive spiral. Alternatively and in addition, a wire may be conductively coupled on and along the lamp surface or a section thereof, or more specifically, wound about the lamp surface or a section thereof.

In accordance with one embodiment of the present invention, the light source module comprises a lamp cover, a lamp and at least a conductive wire. The lamp is fitted in the lamp cover and has two electrodes.

The conductive wire is wound around the lamp and the conductive wire has at least one end connected to the lamp cover. In addition, the electrically coupled structure may be connected to a ground terminal so that the lamp cover and the surface of the lamp can both be connected to the ground. The lamp is fitted into the lamp cover by using fastening units arranged in the lamp cover. The lamp cover includes at least a heat conductive plate connected with the conductive wire. Preferably, the winding density of the conductive wire close to the electrodes is larger than that apart from the electrodes.

In accordance with another embodiment of the present invention, a transparent conductive layer formed on the lamp, which is electrically isolated from the electrodes of the lamp. Said conductive layer is electrically coupled to the lamp cover, and/or to ground, by a wire for example. Alternatively or in addition, a conductive wire can be wound onto the transparent conductive layer, for example with a fixed winding pitch and the two ends of the conductive wire is connected to the lamp cover.

In accordance with yet another embodiment of the present invention, a plurality of conductive wires can be wound on different portions of the lamp and two ends of each of the conductive wires are connected to the lamp cover.

In summary, the lamp cover and the surface of the lamp are electrically connected (and optionally grounding the connected structure the capacitance there-between can be discharged to the ground), thereby eliminating the capacitance built-up there-between. Therefore, the stability of light intensity of the lamp can be improved. Moreover, the heat generated by electrodes at two ends of the lamp can be efficiently dissipated through the conductive wire and thereby the service life of the light source module can be enhanced. Moreover, a transparent conductive layer can be formed on almost the whole surface of the lamp and at least a conductive wire is wound on the transparent conductive layer. Therefore, the electrical connectivity can be enhanced and the display effect of the panel can be improved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE ILLUSTRATED EMBODIMENTS

The simplest embodiment of the present invention would be to simply electrically coupling or shorting the surface of the lamp to the lamp cover. Alternatively or in addition, the surface of the lamp and the lamp cover may be separately grounded to a ground terminal, or the electrically coupled lamp surface and lamp cover may be grounded. To facilitate electrically coupling to the lamp surface, either from the lamp cover or the ground terminal, a conductive layer may be provided on the lamp or sections thereof, in the form of a continuous layer (preferably a transparent or light transmitting layer), a conductive perforated layer, a conductive net or mesh, a conductive sleeve, or a conductive spiral. Alternatively and in addition, a wire may be conductively coupled on and along the lamp surface or a section thereof, or more specifically, wound about the lamp surface or a section thereof.

Various specific embodiments of the present invention are disclosed below, illustrating examples of various possible implementations of the concepts of the present invention. The following description is made for the purpose of illustrating the general principles of the invention and should not be taken in a limiting sense. The scope of the invention is best determined by reference to the appended claims.

THE FIRST EMBODIMENT

Figure 1:
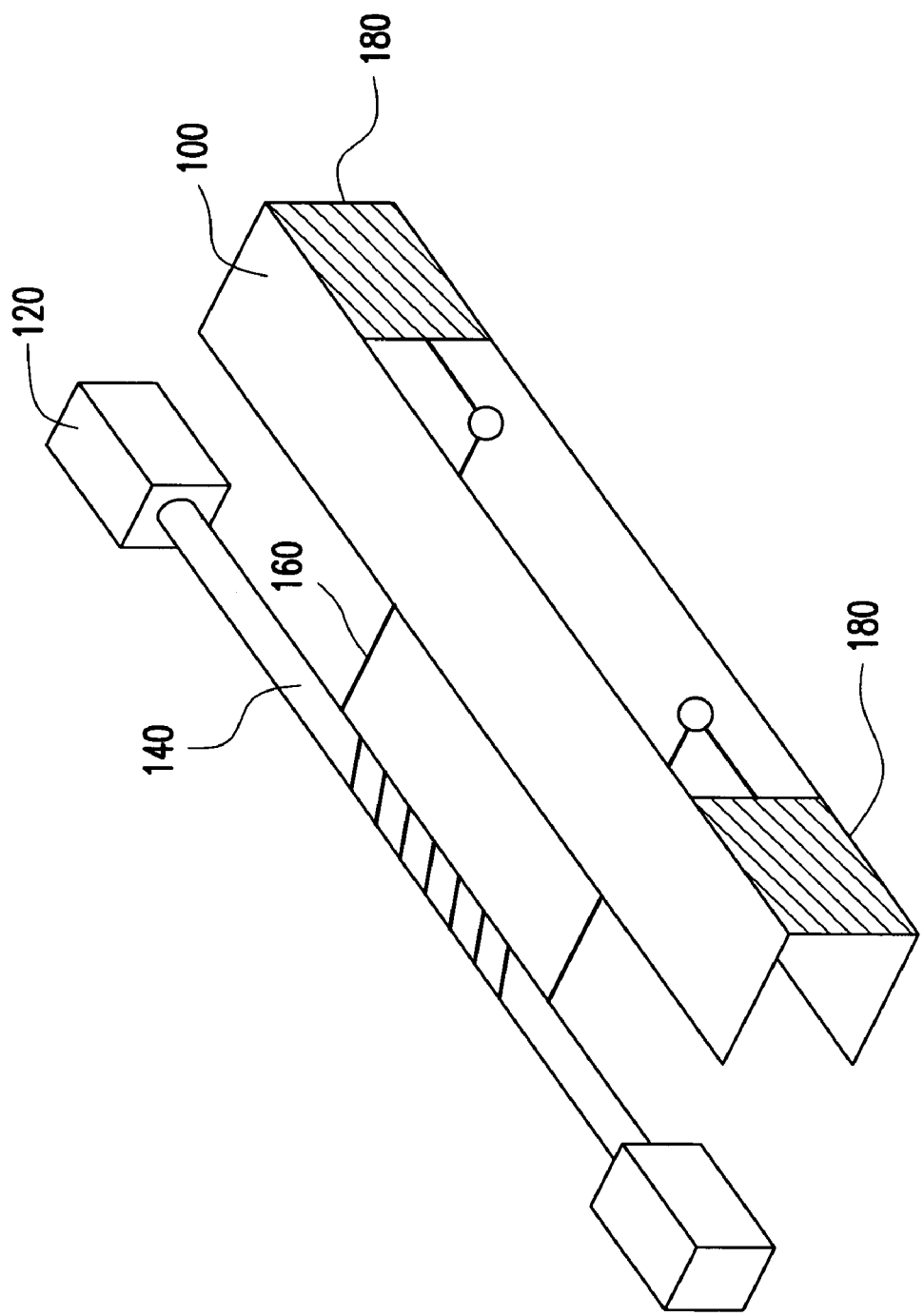
FIG. 1 is a schematic perspective view of a light source module according to a first embodiment of the present invention.

FIG. 1 schematically shows a perspective view of a light source module according to a first embodiment of the present invention. As shown in FIG. 1, the light source module includes a lamp cover 100, a lamp 140 and a conductive wire 160. The lamp 140 can be fastened on the lamp cover 100 by using fastening units 120 made of a rubber material, for example. The lamp cover 100 can be comprised of a light-reflective material, such as metal. The lamp 140 can be a cold cathode fluorescence lamp (CCFL), for example. The conductive wire 160 is wound onto a tube wall 142 of the lamp 140 and has two ends connected to the lamp cover 100. The lamp cover 100 includes two heat conductive plates 180 connected with two ends of the conductive wire 160, respectively.

Figure 2:
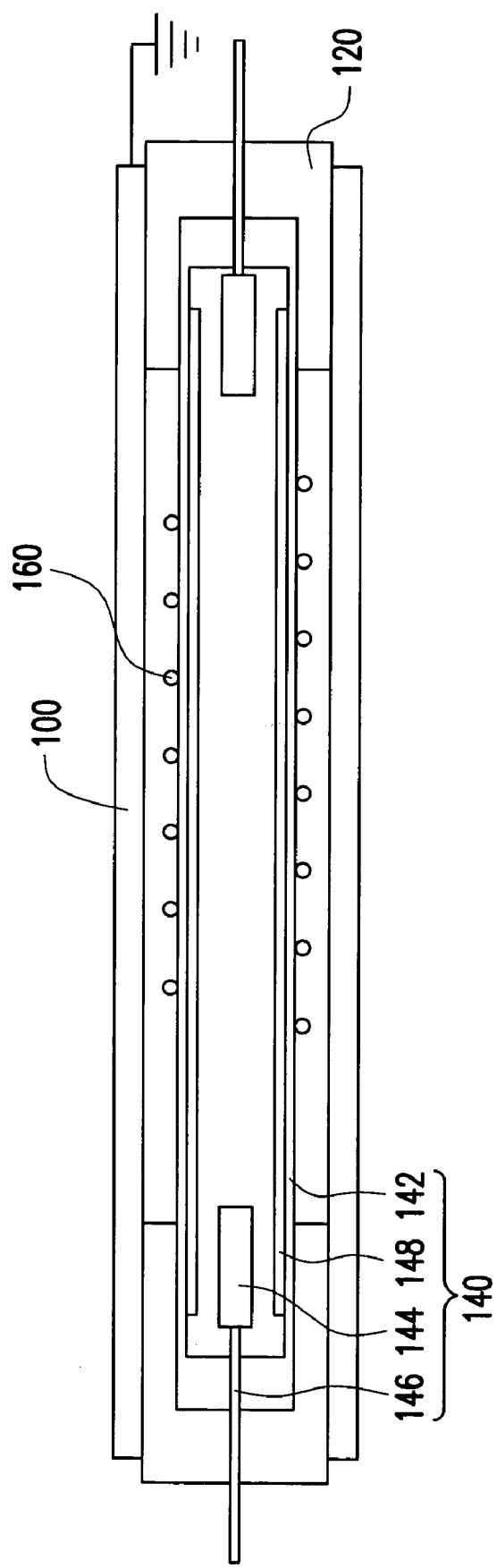
FIG. 2 is a schematic cross-sectional view of a light source module according to the first embodiment of the present invention.

FIG. 2 is a schematic cross-sectional view of a light source module according to a first embodiment of the present invention. As shown in FIG. 2, the lamp 140 includes a tube wall 142, electrodes 144, lead wires 146 and a fluorescence layer 148. The fluorescence layer 148 is formed on the tube wall 142 of the lamp 140. The electrodes 144 are disposed on two ends of the lamp 140 and are electrically connected to an external circuit through the lead wires 146. The conductive wire 160 connects the tube wall 142 of the lamp 140 to the lamp cover 100 and thereby the tube wall 142 of the lamp 140 can be connected to the ground. For example, the external ground terminal can be a chassis ground or a ground terminal of a device controller, of a display device, or an electronic device.

Referring to FIGS. 1 and 2, when the power is supplied to the light source module, the electrodes 144 located at two ends of the lamp 140 gets discharged under the influence of a high electrical voltage and a capacitance is generated between the lamp cover 100 and the lamp 140. The generated capacitance can be discharged to the ground by connecting the lamp cover 100 and the surface of the lamp 140 to the ground terminal through the conductive wire 160. In other words, the lamp cover 100 and the surface of lamp 140 are connected to the ground so that the capacitance generated between the lamp cover 100 and the surface of the lamp 140 can be discharged to the ground. Moreover, the heat generated by the electrodes 144 of the lamp 140 during the operation can be transferred to the heat conductive plate 180 of the lamp cover 100 through the conductive wire 160. As a result, the heat can be efficiently dissipated to the ambient and the service life of the lamp can be improved.

THE SECOND EMBODIMENT

In the above embodiment, a conductive wire connects the surface of the lamp, and the lamp cover to the ground and thereby the capacitance there-between can be substantially eliminated. However, the present invention is not limited to the above embodiment, a transparent conductive layer can also be used in conjunction with a conductive wire for eliminating the capacitance between the lamp and the lamp cover as described in the following second embodiment of the present invention.

Figure 3:
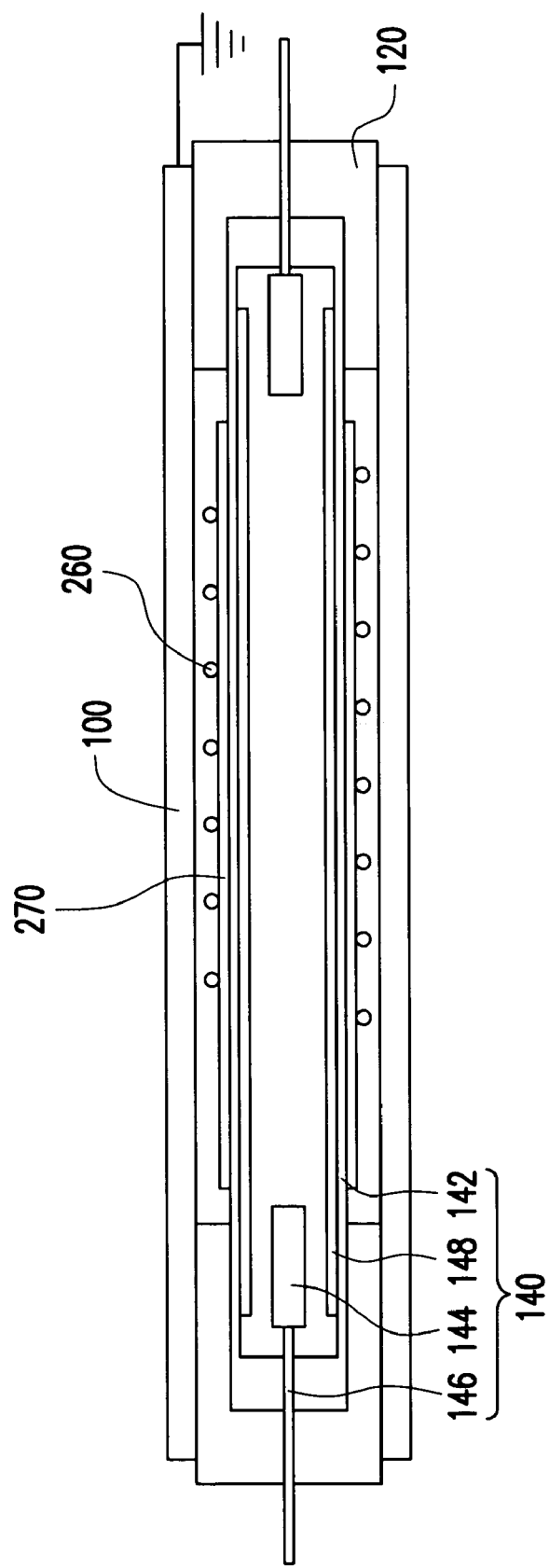
FIG. 3 is a schematic cross-sectional view of a light source module according to a second embodiment of the present invention.

FIG. 3 is a schematic cross-sectional view of a light source module according to a second embodiment of the present invention. As shown in FIG. 3, the structure of the light source module of the second embodiment is similar to the first embodiment except for a transparent conductive layer 270 formed on the tube wall 142 of the lamp 140, which is not electrically connected to the electrodes 144. A conductive wire 260 is wound onto the transparent conductive layer 270 and the two ends thereof are connected to the lamp cover 100. The transparent conductive layer 270 is uniformly formed on the tube wall 142 of the lamp 140, such that the whole central portion of the lamp 140 covered with the transparent conductive layer 270 Can be connected to the ground. Likewise, the capacitance between the lamp cover 100 and the lamp 140 can be eliminated. Moreover, the transparent conductive layer 270 can further improve the heat dissipation. The conductive layer 270 may be formed by deposition, coating, or wrapping a conductive film around the lamp 140. While the conductive layer 270 is shown to extend along substantially the entire length of the light section of the lamp 140, the conductive layer 270 may partially cover the lamp 140, for example along the section of the cylindrical lamp surface that faces the lamp cover, between which capacitance is most likely to be created.

Figure 4:
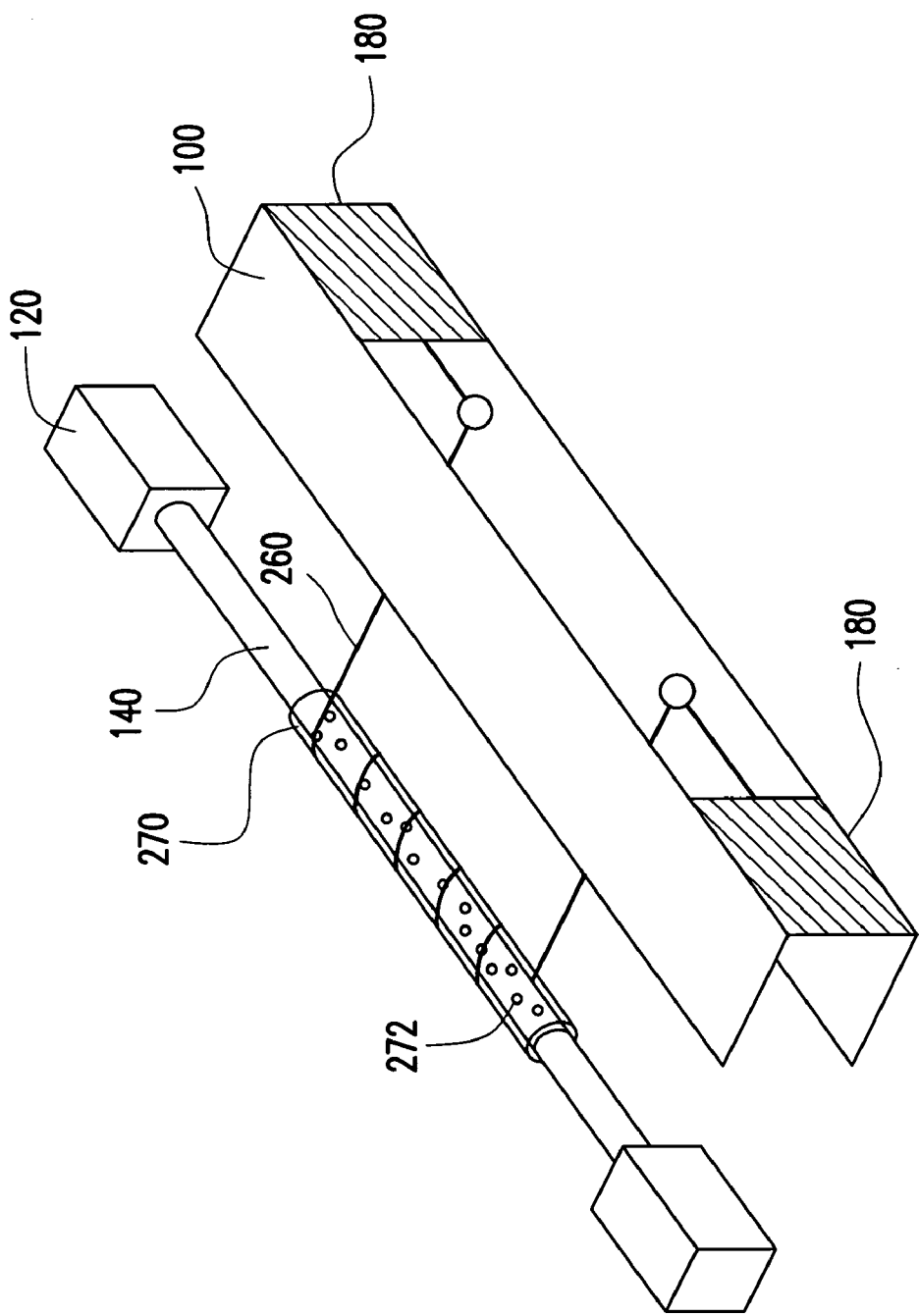
FIG. 4 is a schematic perspective view of a light source module having a conductive layer with multiple apertures.

In one aspect, the conductive layer 270 may has multiple apertures or orifices 272, as shown in FIG. 4. A conductive wire 260 is wound onto the transparent conductive layer 270 and the two ends thereof are connected to the lamp cover 100.

Figure 5:
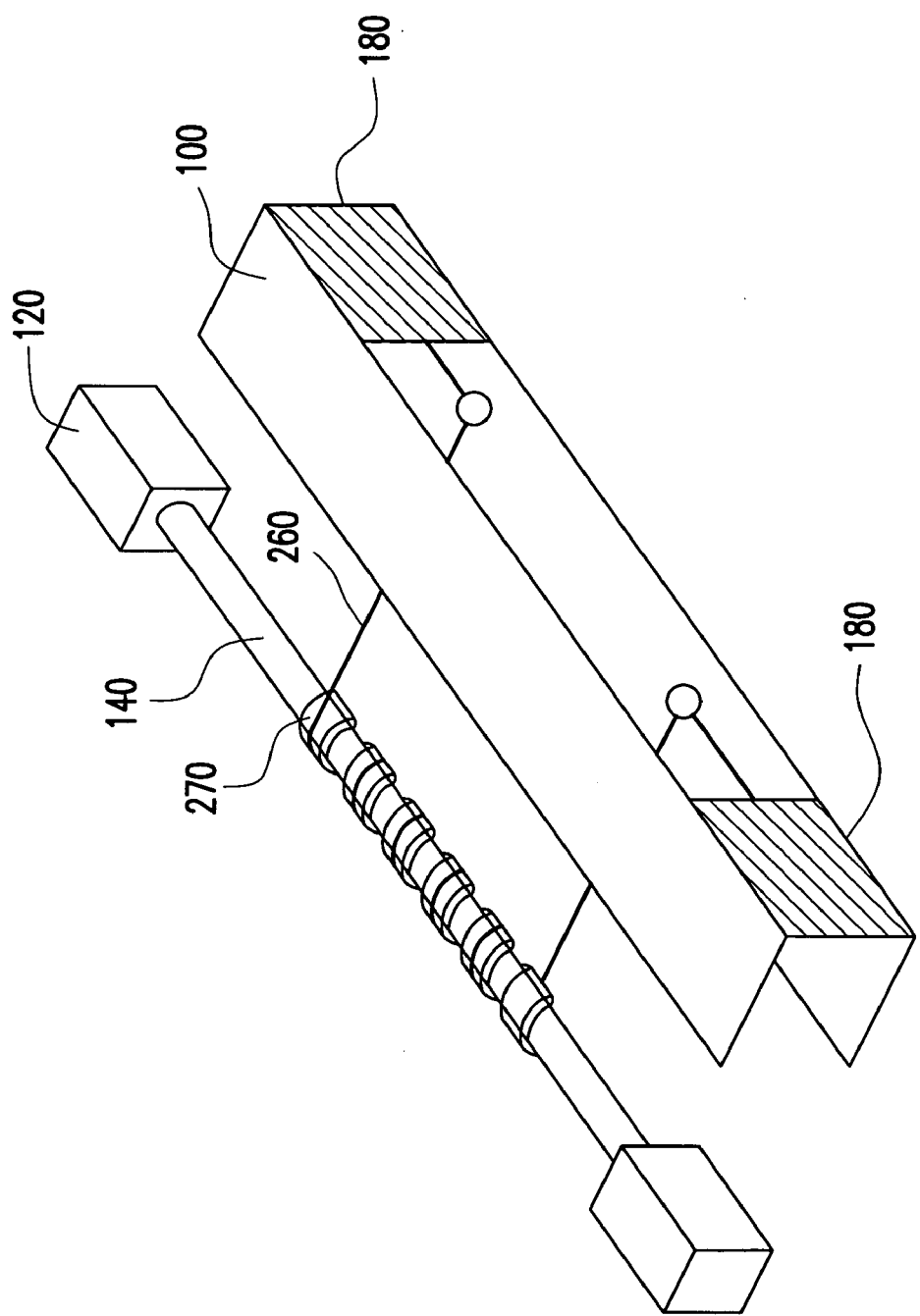
FIG. 5 is a schematic perspective view of a light source module having a conductive layer in the form of a spiral.
Figure 6:
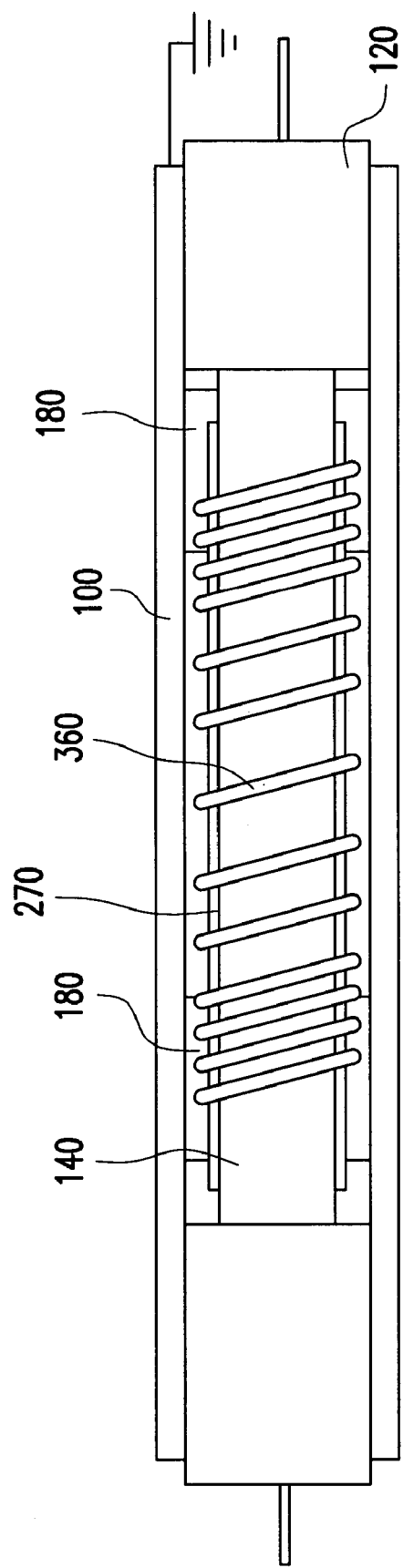
FIG. 6 is a schematic cross-sectional view of a light source module according to a third embodiment of the present invention.

In another aspect, the conductive layer 270 may be in form of a spiral, as shown in FIG. 5. A conductive wire 260 is wound onto the transparent conductive layer 270 and the two ends thereof are connected to the lamp cover 100.

THE THIRD EMBODIMENT

It the above first and second embodiment, the present invention respectively shows the use of the conductive wire to connect the surface of the lamp, and the lamp cover to the ground in order to eliminate the capacitance between the lamp and the lamp cover, and the use of the transparent conductive film in conjunction with the conductive wire to respectively improve the heat dissipation and eliminate the capacitance between the lamp and the lamp cover. The conductive wire is wound around the lamp with a fixed winding pitch. However, the present invention is not limited to winding the conductive wire around the lamp with a fixed pitch. Alternatively, the conductive wire can be wound with different pitches, the conductive wire wound with different pitches around the lamp can improve the heat dissipation. The detail is described as below.

FIG. 5 is a cross-sectional view of a light source module according to a third embodiment of the present invention. As shown in FIG. 4, the light source module of the third embodiment of the present invention is similar to the second embodiment shown in FIG. 3 except for a conductive wire 360 wound on the transparent conductive layer 270 with different winding pitches, which has two ends connected to the lamp cover 100. In this embodiment, the density of the winding of the conductive wire 360 close to the two ends of the lamp 140 is larger than that apart from the two ends of the lamp 140.

A best winding mode for winding the conductive wire 360 on the lamp 140 can be attained through a simulation and analyzing process for improving an electrical conductivity and heat conductivity effects. In addition, the above winding mode of the present embodiment can also be applied in the first embodiment.

THE FOURTH EMBODIMENT

In the above first, second and third embodiments, the present invention shows the use of one conductive wire and two heat conductive plates fitted on a light source module to achieve the features described above. However, the present invention is not limited thereto, more than one conductive wire and more than two heat conductive plates can be fitted on the light source module for improving the heat dissipation from a lamp and the electrical connection between a lamp and a lamp cover. The detail is described as below.

Figure 7:
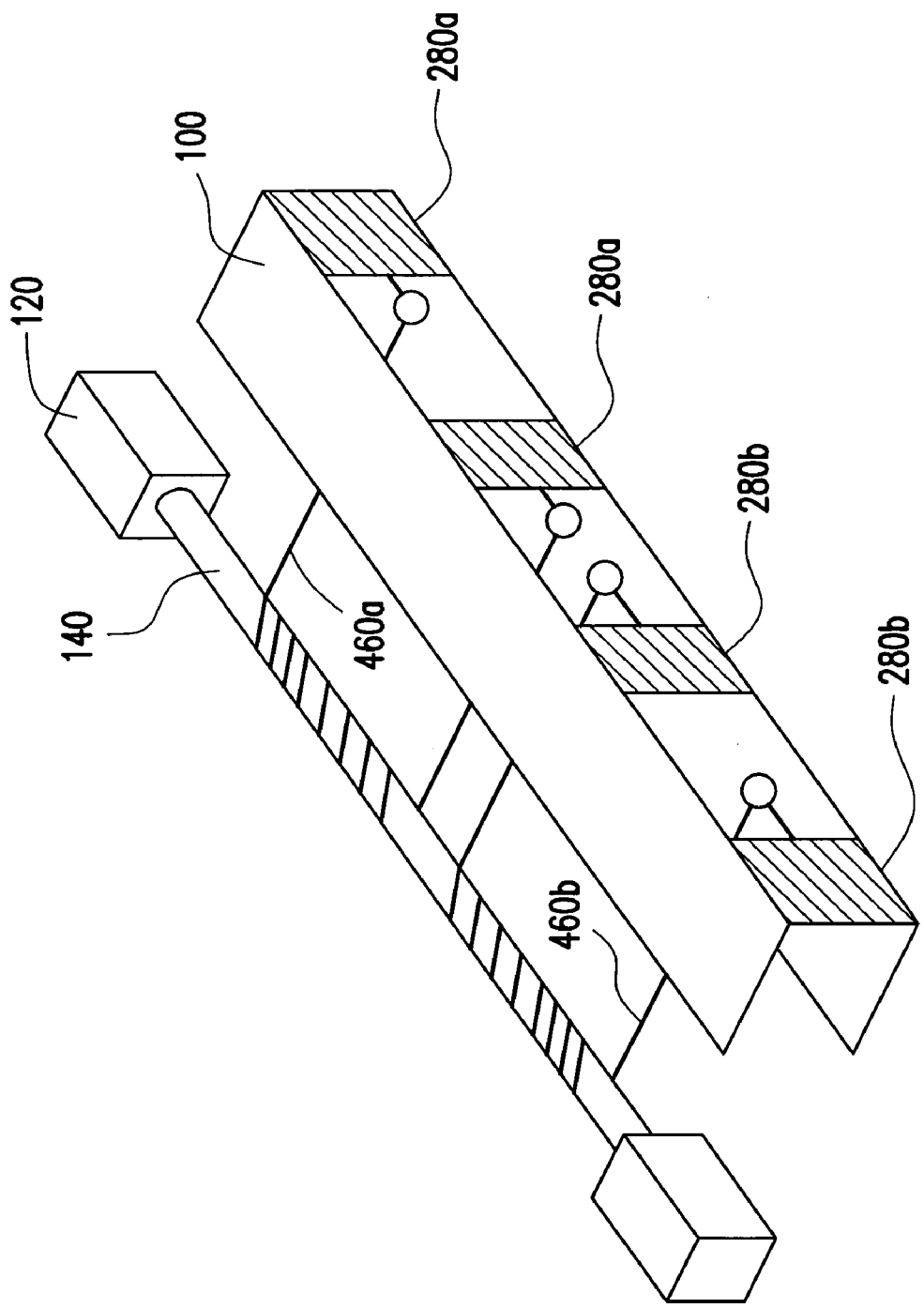
FIG. 7 is a schematic perspective view of a light source module according to a fourth embodiment of the present invention.

FIG. 7 schematically shows a perspective view of a light source module according to a fourth embodiment of the present invention. Referring to FIG. 7, the light source module of the fourth embodiment is similar to the second embodiment except that the lamp cover 100 includes two heat conductive plates 280a and 280b and two conductive wires 460a and 460b connected to the heat conductive plates 280a and 280b of the lamp cover 100, respectively. As shown in FIG. 7, the conductive wires 460a and 460b are wound on the lamp 140 with the same or different winding pitches. While FIG. 7 illustrates separate connections of the wires 460a and 460b to separate sections of the lamp cover 100, it is well within the scope of the present invention to vary such connections to achieve the objective of electrically coupling the wires to the lamp cover. For example, the end of the wires may be electrically coupled together, and commonly coupled to the lamp cover.

Figure 8:
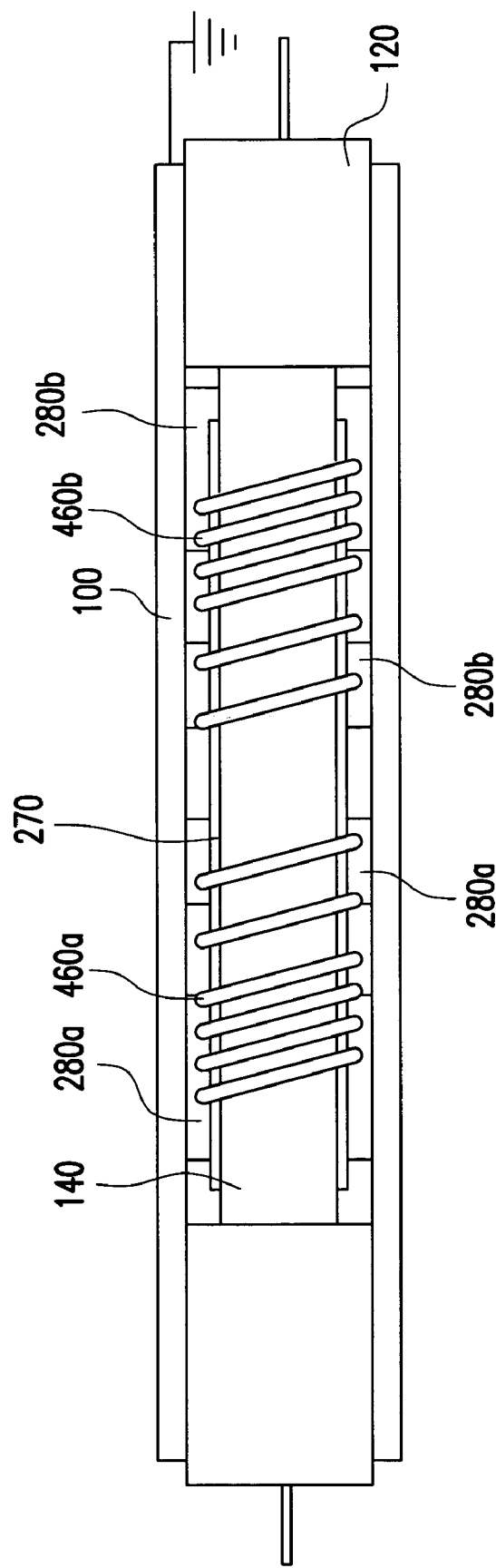
FIG. 8 is a schematic cross-sectional view of a light source module according to the fourth embodiment of the present invention.

FIG. 8 schematically shows a cross-sectional view of a light source module according to a fourth embodiment of the present invention. As shown FIG. 8, the conductive wires 460a and 460b are wound on the transparent conductive layer 270 formed on the lamp 140 with different winding pitches. Preferably, the density of the winding the conductive wires 460a and 460b close to the two ends of the lamp 140 are larger than that apart from the two ends of the lamp 140.

While the figures described above illustrates wires that are round in cross section, wires (which may be in the form of conductive strips) of other cross sectional geometry may be used without departing from the scope and spirit of the present invention.

Figure 9:
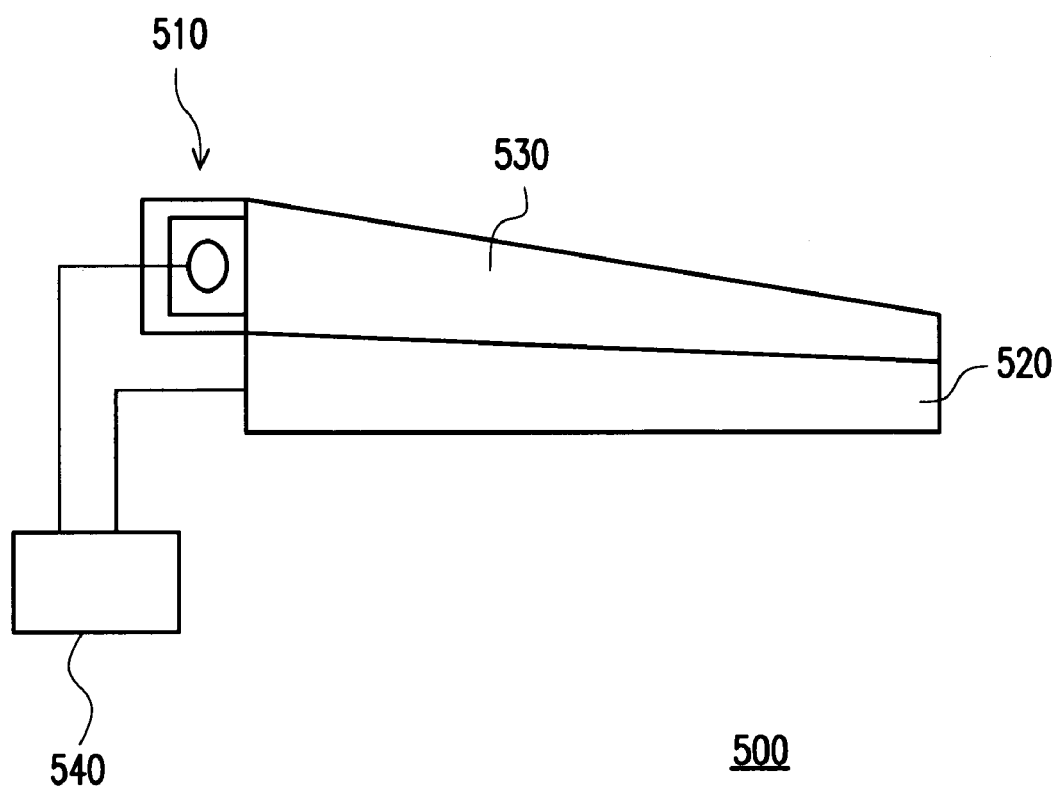
FIG. 9 is a schematic diagram illustrating a liquid crystal display incorporating the light source module according to one embodiment of the present invention.

The light source module depicted in above embodiments can be deployed in a liquid crystal display, as shown in FIG. 9. FIG. 9 is a schematic diagram illustrating a liquid crystal display incorporating the light source module according to one embodiment of the present invention. The liquid crystal display 500 includes a light source module 510 as in any one of the above embodiments, a liquid crystal module 520, a backlighting module 530 for optically coupling the light source module 510 to the liquid crystal module 520, and control electronics 540 operatively coupled to the light source module 510 and the liquid crystal module 520.

Figure 10:
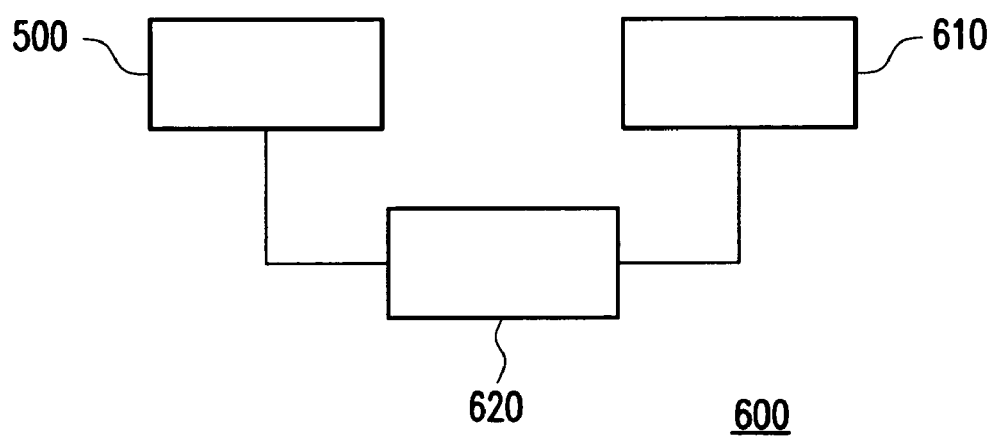
FIG. 10 is a schematic diagram illustrating an electronic device incorporating a liquid crystal display shown in FIG. 7.

FIG. 10 is a schematic diagram illustrating an electronic device incorporating a liquid crystal display shown in FIG. 7. The electronic device 600 may be a portable device such as a PDA, notebook computer, tablet computer, cellular phone, or a display monitor device, etc. Generally, the electronic device 600 includes an above-mentioned liquid crystal display 500, a data input interface 610, and device control electronics 620 operatively coupled to the liquid crystal display 500, to process image data to be rendered as an image on the liquid crystal display 500.

CONCLUSION

The light source module of the present invention includes the following advantages:

1. The lamp cover and the lamp are electrically connected to the ground through at least one conductive wire so that the lamp and the lamp cover have the substantially same potential and the capacitance there-between can be eliminated. The disadvantage of the lamp flash due to, for example, unstable light intensity due to capacitance between the lamp and the lamp cover, can be avoided and the stability of light intensity of the lamp can be improved. Moreover, the heat generated by electrodes at two ends of the lamp can be efficiently dissipated through the conductive wire and thereby the service life of the light source module can be enhanced.

2. The transparent conductive layer is formed on the nearly whole surface of a lamp and at least a conductive wire is wound on the transparent conductive layer. Therefore, the heat dissipation can be substantially improved and the lamp flash phenomenon can be substantially reduced.

3. At least one conductive wire is wound around the lamp with different winding pitches to improve heat dissipation from the lamp. Therefore, the service life of the lamp can be extended.

4. Further, a plurality of conductive wires and a plurality of heat conductive plate can be fitted in the light source module to improve the heat dissipation according to the requirement.

Although the invention has been described with reference to a particular embodiment thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A light source module, comprising:
 a lamp cover; and
 a lamp fitted in said lamp cover, said lamp having a lamp surface that is elongated and spaced separate and apart at a distance from the lamp cover, and said lamp surface is electrically coupled to the lamp cover.

2. The light source module of claim 1, wherein the lamp surface is electrically coupled to the lamp cover via ground.

3. The light source module of claim 1, wherein the lamp surface is electrically coupled to the lamp cover by a conductive wire.

4. The light source module of claim 3, wherein the wire is electrically coupled to at least a section of the lamp surface.

5. The light source module of claim 4, wherein the wire is wound around at least a section of the lamp surface.

6. The light source module of claim 4, wherein the lamp surface is electrically coupled to the lamp cover by a plurality of wires wound around different sections along the lamp surface, and wherein the plurality of wires are electrically coupled to the lamp cover.

7. The light source module of claim 1, wherein the lamp surface is provided with a conductive layer electrically coupled to the lamp cover.

8. The light source module of claim 7, wherein the conductive layer is in the form of a spiral, electrically coupled to the lamp surface.

9. The light source module of claim 8, wherein the conductive layer partially covers at least a section of the lamp surface.

10. The light source module of claim 8, wherein the spiral is in the form of a wire wrapped around a section of the lamp surface.

11. The light source module of claim 7, further comprising a wire electrically coupled to at least a section of the conductive layer, wherein the wire is wrapped around the lamp surface at a fixed pitch.

12. The light source module of claim 7, wherein the conductive layer has a plurality of apertures.

13. The light source module of claim 1, further comprising a wire electrically coupled to at least a section of the conductive layer, wherein the wire is wrapped around the lamp surface at a varying pitch.

14. The light source module of claim 13, wherein the lamp comprises electrodes at two ends of the lamp, and wherein the varying pitch comprises narrow pitch along the lamp surfaces near the electrodes, and wider pitch along the lamp surfaces away from the electrode.

15. The light source module of claim 1, wherein the lamp cover comprises at least one heat dissipating section, and wherein the lamp surface is electrically coupled to said at least one heat dissipating section.

16. The light source module of claim 15, wherein the lamp cover comprises a plurality of heat dissipating sections, and wherein the lamp surface is electrically coupled to said plurality of heat dissipating sections.

17. A liquid crystal display, comprising:
 a light source module as in claim 1;
 a liquid crystal module optically coupled to the light source module; and
 control electronics operatively coupled to the light source module and the liquid crystal module.

18. The liquid crystal display of claim 17, further comprising a backlighting module for optically coupling the light source module to the liquid crystal module.

19. An electronic device, comprising:
 a liquid crystal display as in claim 17;
 a data input interface; and
 device control electronics operatively coupled to the liquid crystal display, to process image data to be rendered as an image on the liquid crystal display.

20. A light source module, comprising:
 a lamp cover;
 a lamp fitted in said lamp cover, said lamp having a lamp surface that is provided with a conductive layer electrically coupled to the lamp cover, and the conductive layer has a plurality of apertures; and
 a wire electrically coupled to at least a section of the conductive layer, wherein the wire is wound around at least a section of the conductive layer.

* * * * *